United States Patent
Sato et al.

(10) Patent No.: US 7,151,771 B2
(45) Date of Patent: *Dec. 19, 2006

(54) COMMUNICATIONS SYSTEM

(75) Inventors: Makoto Sato, Kanagawa (JP); Harumi Kawamura, Tokyo (JP); Yuko Iijima, Kanagawa (JP); Hisato Shima, Chiba (JP)

(73) Assignee: Sony Corporation, Tokyo (JP)

(*) Notice: Subject to any disclaimer, the term of this patent is extended or adjusted under 35 U.S.C. 154(b) by 204 days.

This patent is subject to a terminal disclaimer.

(21) Appl. No.: 10/440,832

(22) Filed: May 19, 2003

(65) Prior Publication Data

US 2003/0193935 A1 Oct. 16, 2003

Related U.S. Application Data

(63) Continuation of application No. 08/738,465, filed on Oct. 24, 1996, now Pat. No. 6,584,099, which is a continuation of application No. 08/354,119, filed on Dec. 6, 1994, now abandoned.

(30) Foreign Application Priority Data

Dec. 10, 1993 (JP) .................................. 5-341748
May 31, 1994 (JP) .................................. 6-141071

(51) Int. Cl.
*H04L 12/28* (2006.01)
(52) U.S. Cl. .................... 370/359; 370/362; 370/419; 370/489
(58) Field of Classification Search ................ 370/282, 370/359, 362, 363, 364, 365, 419, 420, 421, 370/423, 489
See application file for complete search history.

(56) References Cited

U.S. PATENT DOCUMENTS

| 4,028,500 | A | * | 6/1977 | McClure et al. ............. 455/566 |
| 4,041,462 | A | * | 8/1977 | Davis et al. ................. 712/228 |
| 4,337,480 | A | | 6/1982 | Bourassin et al. ............. 358/93 |
| 4,450,554 | A | | 5/1984 | Steensma et al. ............... 370/4 |
| 4,581,645 | A | | 4/1986 | Beyers et al. ................ 358/181 |

(Continued)

FOREIGN PATENT DOCUMENTS

CA          2 085 959          6/1994

(Continued)

OTHER PUBLICATIONS

European search report dated Sep. 23, 2005, from the European Patent Office.

*Primary Examiner*—Ricky Q. Ngo
*Assistant Examiner*—Shick Hom
(74) *Attorney, Agent, or Firm*—Finnegan, Henderson, Farabow, Garrett & Dunner L.L.P.

(57) ABSTRACT

A communications system connected via a bus capable of transmitting multiplexed packets of control signals and AV signals while providing an environment, which is the same as an environment where connections are made using analog signal lines. A register with a fixed address is taken to be a virtual plug for each of a plurality of equipment. When the plug enable for the input plug is set to 1, an isochronous communication packet for the AV signal on the channel set by the channel number is received. When the plug enable for the output plug is set to one and the isochronous communication packet for the information signal is sent on the channel, then the channel number is set in the channel number field at a transmission speed designated by the DR (Data Rate) field at the bandwidth presented in the bandwidth field.

5 Claims, 16 Drawing Sheets

U.S. PATENT DOCUMENTS

| | | |
|---|---|---|
| 5,170,252 A | 12/1992 | Gear et al. .................. 348/659 |
| 5,258,999 A | 11/1993 | Wernimont et al. ............ 375/7 |
| 5,282,038 A | 1/1994 | Lowe ......................... 348/659 |
| 5,313,454 A | 5/1994 | Bustini et al. ............. 370/94.2 |
| 5,389,963 A | 2/1995 | Lepley et al. ................. 725/78 |
| 5,402,419 A | 3/1995 | Osakabe et al. ........... 370/94.1 |
| 5,414,707 A | 5/1995 | Johnston et al. ........... 370/94.1 |
| 5,416,906 A | 5/1995 | Mariani ................. 340/825.07 |
| 5,422,882 A | 6/1995 | Hiller et al. .............. 370/60.1 |
| 5,425,022 A | 6/1995 | Clark et al. ................ 370/85.1 |
| 5,434,981 A | 7/1995 | Lenihan et al. ........... 370/85.1 |
| 5,448,562 A | 9/1995 | Osakabe et al. ........... 370/392 |
| 5,455,619 A | 10/1995 | Truckenmiller et al. ...... 725/78 |
| 5,608,730 A | 3/1997 | Osakabe et al. ............. 370/471 |
| 5,621,456 A | 4/1997 | Florin et al. .................... 348/7 |
| 5,805,073 A * | 9/1998 | Nagano et al. ............ 340/3.53 |
| 5,883,677 A | 3/1999 | Hofmann ...................... 725/59 |
| 5,894,320 A | 4/1999 | Vancelette ................... 725/59 |

FOREIGN PATENT DOCUMENTS

| | | |
|---|---|---|
| EP | 0 015 797 | 9/1980 |
| EP | 0 604 166 B1 | 6/1994 |
| EP | 0604 167 B1 | 6/1994 |
| EP | 0 608 624 B1 | 8/1994 |
| EP | 0 610 630 B1 | 8/1994 |
| WO | WO 93/00752 | 1/1993 |

* cited by examiner

CSP : Cycle start packet

FIG.5

| Bit coding b9 b8 b7 b6 b5  b4 b3 b2 b1 b0 | sub-device number /category type | |
|---|---|---|
| 0 0 1 0 0 0 0 0 0 0 | number | VTR Deck 1 |
| 0 0 1 0 0 0 0 0 0 1 | | VTR Deck 2 |
| 0 0 1 0 0 0 0 0 1 0 | | VTR Deck 3 |
| ⋮ | | ⋮ |
| 0 0 1 0 0 0 0 1 1 0 | | VTR Deck 7 |
| 0 0 1 0 0 0 1 0 0 0 | category Type | VHS/S-VHS |
| 0 0 1 0 0 0 1 0 0 1 | | 8 mm/Hi8 |
| 0 0 1 0 0 0 1 0 1 0 | | Beta/ED-Beta |
| 0 0 1 0 0 0 1 0 1 1 | | VHS-C/S-VHS-C |
| 0 0 1 0 0 0 1 1 0 0 | | Digital VTR |
| 0 0 1 0 0 0 1 1 0 1 | | W-VHS |
| 0 0 1 0 0 0 1 1 1 0 | | Reserved |
| ⋮ | | ⋮ |
| 0 0 1 0 0 1 1 1 1 0 | | Reserved |
| 0 0 1 0 0 1 1 1 1 1 | | Any VTR |

FIG.6

| examples of categories which actually correspond to sub-device numbers |
|---|
| VHS/S-VHS |
| 8 mm/Hi8 |
| No existence |
| ⋮ |
| No existence |

FIG. 7

| Bit coding b9 b8 b7 b6 b5 b4 b3 b2 b1 b0 | plug number / category type | |
|---|---|---|
| 0 0 0 0 0 0 0 0 0 0 | plug number | plug 1 |
| 0 0 0 0 0 0 0 0 0 1 | | plug 2 |
| 0 0 0 0 0 0 0 0 1 0 | | plug 3 |
| ⋮ | | ⋮ |
| 0 0 0 0 1 1 1 1 1 1 | | plug 64 |
| 0 0 0 1 0 0 0 0 0 0 | | digital bus ch 1 |
| 0 0 0 1 0 0 0 0 0 1 | | digital bus ch 2 |
| 0 0 0 1 0 0 0 0 1 0 | | digital bus ch 3 |
| ⋮ | | ⋮ |
| 0 0 0 1 1 1 1 1 1 1 | | digital bus ch 64 |
| 0 0 1 0 0 0 0 0 0 0 | category type | monitor |
| 0 0 1 0 0 0 0 0 0 1 | | audio amplifier |
| 0 0 1 0 0 0 0 0 1 0 | | Reserved |
| 0 0 1 0 0 0 0 0 1 1 | | Reserved |
| 0 0 1 0 0 0 0 1 0 0 | | VTR |
| 0 0 1 0 0 0 0 1 0 1 | | tuner |
| 0 0 1 0 0 0 0 1 1 0 | | MDP |
| 0 0 1 0 0 0 0 1 1 1 | | camera |
| 0 0 1 0 0 0 1 0 0 0 | | teletext |
| 0 0 1 0 0 0 1 0 0 1 | | video text |
| 0 0 1 0 0 0 1 0 1 0 | | video printer |
| 0 0 1 0 0 0 1 0 1 1 | | FAX |
| 0 0 1 0 0 0 1 1 0 0 | | video effects unit |
| ⋮ | | ⋮ |
| 0 0 1 0 0 1 1 1 1 1 | | Reserved |
| 0 0 1 0 1 0 0 0 0 0 | | analog line input/output |
| 0 0 1 0 1 0 0 0 0 1 | | digital line input/output |
| 0 0 1 0 1 0 0 0 1 0 | | digital bus ch ? |
| ⋮ | | ⋮ |
| 1 1 1 1 1 1 1 1 1 1 | | Reserved |

FIG.8

| Examples of categories/addresses which actually correspond to plug numbers. ||
|---|---|
| input | output |
| analog line input<br>analog line input<br>No existence<br>⋮<br>No existence | monitor<br>analog line output<br>digital line output<br>⋮<br>No existence |
| The channel to be used for input/output is decided actively by the command.<br>The address of the opposing item which the conection is being made to is therefore held (in the case of output, there may be many itmes). ||

FIG.9

| Examples of categories/addresses which actually correspond to plug numbers. ||
|---|---|
| input | output |
| Camera<br>CD<br>No existence<br>⋮<br>No existence | monitor<br>video printer<br>audio deck<br>⋮<br>No existence |
|  | TV, VTR2 |

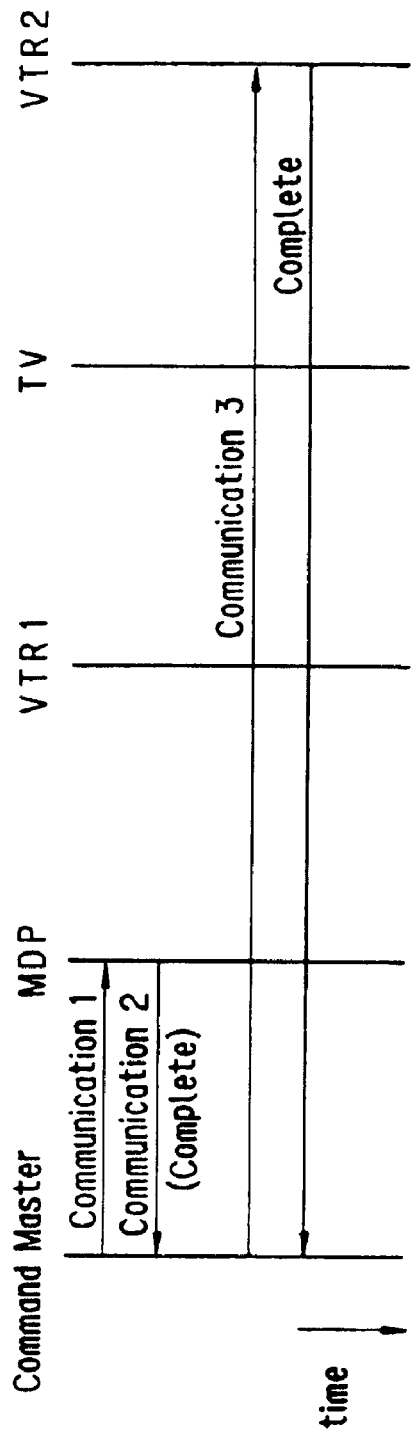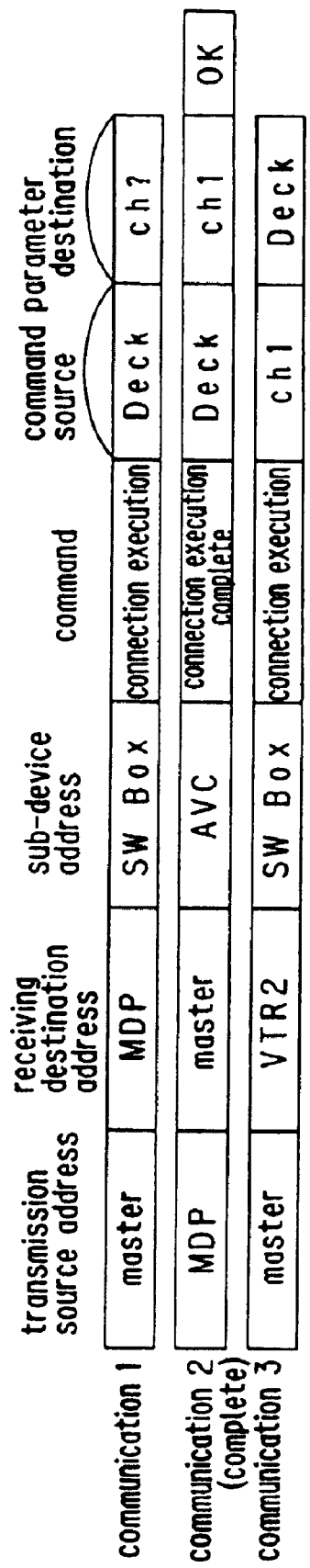

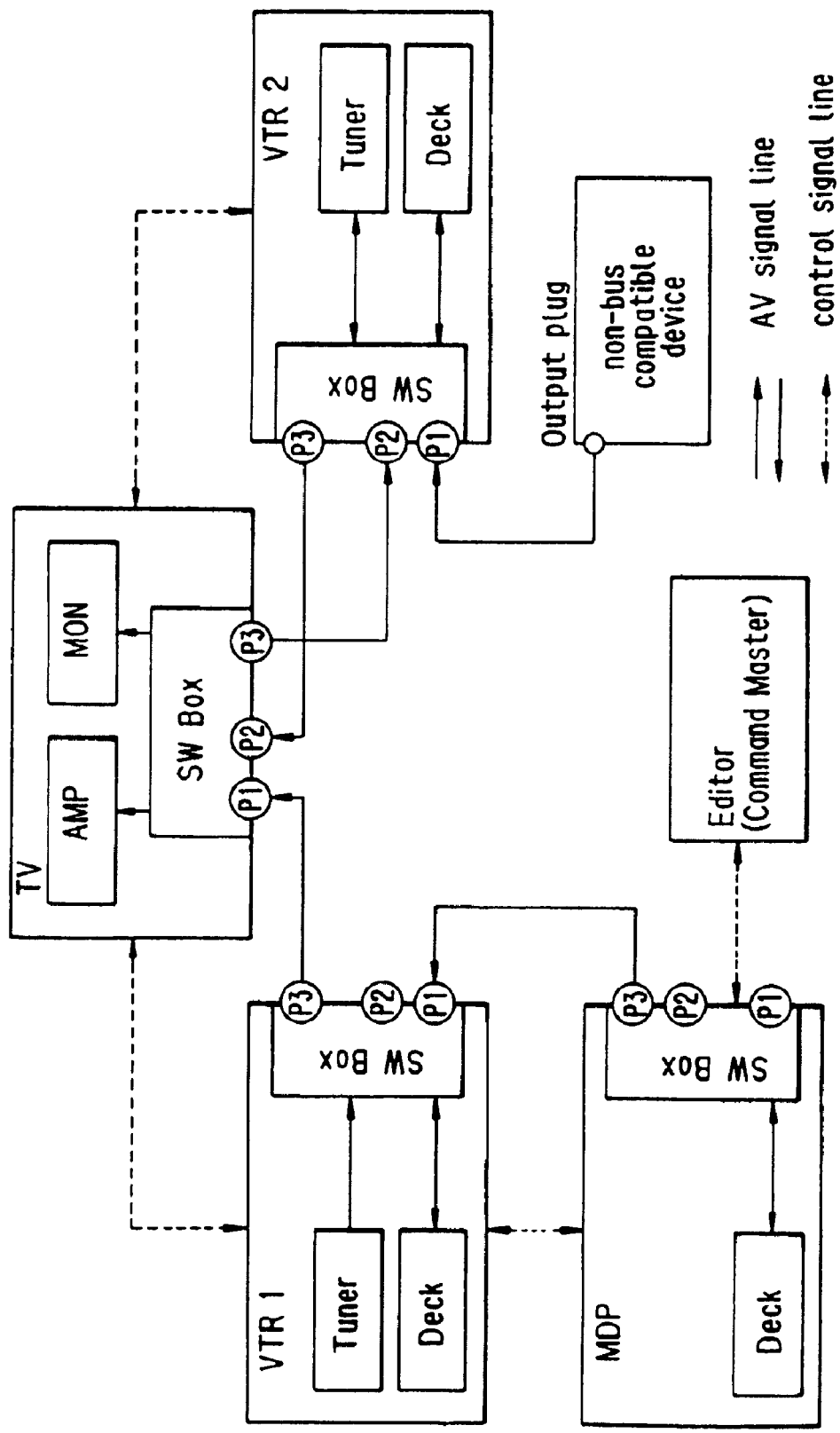

COMMUNICATIONS SYSTEM

This is a Continuation of prior applicaton Ser. No. 08/738,465, filed Oct. 24, 1996, now U.S. Pat. No. 6,584,099, which is a continuation of application Ser. No. 08/354,119 filed Dec. 6, 1994.

BACKGROUND OF THE INVENTION

1. Field of the Invention

The present invention relates to way of structuring input/output plugs and a digital interface for equipment in a communications system where a number of items of equipment capable of mixing and transferring as packets control signals and information signals are connected via a bus.

2. Description of the Related Art

In conventional communication systems where AV equipment such as, for example, Video Tape Recorders (hereinafter referred to as VTRs), Televisions (hereinafter referred to as TVs) etc. are connected together via analog AV signal lines and digital control signal lines, a DDB (Domestic Digital Bus) has been used. Examples of this kind of system are described in the European patents belonging to the same applicant relating to this kind of communications system. These patents are publication number EP 0 604 166, EP 0 610 630, EP 0 604 167 and EP 0 608 624. Applications are currently under way for American patents which will correspond to these patents.

First, a description will be given of an example of this kind of communications system with reference to FIG. 17. This kind of communications system is equipped with a TV, a VTR 1, a VTR 2, a Multi Disc Player (herinafter referred to as an MDP), and an editor. The VTR 2 is also connected to a device which is not compatible with a digital control signal line (hereinafter referred to as a non-bus compatible device).

The AV signal input/output plug for the non-bus compatible device is connected to input/output plugs of other devices only by plugs described by P1, P2 and P3, protruding directly out from units known as switchboxes (SW box) via analog AV signal lines. Commands such as connection control commands etc. are sent and received by other devices via analog AV signal lines and digital control signal lines which are connected separately. Each item of equipment is also equipped with one or more functional units, which in the case of a VTR would be a deck for recording and playing back and a tuner for selecting the signal to be received, and in the case of a TV, would be a monitor and an amplifier. There is also an AVC (AV controller) for controlling the operation of all of the items of equipment, although this is not shown in the diagrams. In the following, these functional units may also be referred to as sub-devices.

Control connection can be carried out in two ways in a communications system structured in this way. These ways, which will be referred to as connection control method 1 and connection control method 2, will be described in numerical order.

In connection control method 1, information pertaining to the connection structure for each device, i.e. which plug is connected to which plug of an opposing item of equipment and whether plugs are used for input or output, is pre-stored by the user. In this way, an output plug which it is considered will make a connection from the sub-device which is to be the AV signal source to the destination may be selected as required while the item of equipment is receiving the connection control command. Alternatively, a path may be set up within the device between the input plug of the designated number and the appropriate output plug, with a command then being transmitted to the device connected previously to the output plug. The object is then achieved at the point in time when the command reaches the sub-device within the specific device indicated by the destination. At this time, commands cannot be transmitted via the control signal line when the device is a non-bus compatible device. The plug numbers for devices connected to this kind of device therefore have to be directly specified (for example, in the case in FIG. 17, the input plug P1 for the VTR 2 is directly specified).

The following is a description with reference to FIG. 18 of the sequence in connection control method 1 when an MDP output is recorded on a VTR 2 as a result of instructions from an editor. FIG. 18(a) shows the communications sequence and FIG. 18(b) shows the commands.

First, the MDP receives a command giving an instruction to connect the deck output to the deck of the VTR 2 from the command master (editor) (communication 1). At this time, none of the output plugs of the MDP are connected to the VTR 2. However, the output plug P3 is connected to the input plug P1 of the VTR 2, so a command is therefore sent to the VTR 1 via a path from the input plug P1 to the switchbox (communication 2).

When the VTR 1 receives this command, none of the output plugs are connected to the VTR 2 but the output plug P3 is connected to the input plug P1 of the TV. A command is therefore sent via a path from the input plug P1 via the switchbox to the TV (communication 3).

When the TV receives this command, it is understood that the output plug P3 is connected to the input plug P2 of the VTR 2 and a command is sent to the VTR 2 form the input plug P2 via the deck (communication 4).

The VTR 2 then receives this command and changes over the switchbox connection so as to input from the input plug P2 to the deck. Once the VTR 2 completes the process 4, the TV is notified of this completion. Upon receival of this, the TV gives notification to the VTR 1 that the process 3 is completed. When the VTR 1 then receives this, it gives notice to the MDP that the process 2 has been completed. Upon receiving this, the MDP gives notice to the command master that the process is completed. These packets are omitted from the diagrams.

Here, an editor has been set up as the command master. However, rather than setting an editor up on the communications system, a structure may be adopted where the MDP and the VTR have command master functions.

In a second connection control method, a single central item of equipment (in the following, this is an AV center) manages all of the connection information regarding which kinds of equipment are connected together via which numbered ports in which directions. If a command requesting AV signal connection via the digital control signal line is then received, this command is sent via the digital control signal line to the target device. The target device then receives this command and changes over the input/output. At this time, it is possible to designate the sub-device by category via the initial connection request from the command master (by BS, CS etc. which are more in line with the objectives, rather than by a tuner etc.). However, at the time of a connection request, an item is only aware of its own plug structure.

The following is a description with reference to FIG. 19 of the sequence in a connection control method 2 when a TV is taken as an AV center and output from an MDP is recorded by a VTR 2. Here, FIG. 19(a) shows the communications sequence and FIG. 19(b) shows the commands.

First, the TV receives a command from the command master instructing it to connect the MDP deck output to the deck of the VTR 2 (communication 1). The TV then receives this command and sends a command to the MDP to the effect that the output for the deck sub-device is to be outputted from the output plug P3 (communication 2).

If the MDP receives this command, the switchbox is changed over so that the deck output is connected to the output plug P3 and notification of the completion of the changeover process is then sent to the TV. If the TV then receives this information, a command is sent from the input plug P1 via the output plug P3 to the VTR 1 (communication 3).

If the VTR 1 receives this command, the switchbox is changed over so that a connection is made from the input plug P1 to the output plug P3 and notification of completion of the changeover process is sent to the TV. If the TV then receives this notification, a command is sent from the input plug P2 to the deck to be inputted to the VTR 2 (communication 4).

Providing the VTR 2 receives this command, the switchbox is changed over so as to input from the input plug P2 to the deck. The TV is then notified when the changeover process is complete.

If the TV then receives notification of completion from the VTR 2, notification of completion of the connection is sent to the command master.

However, with connection control method 1, the digital control signal line becomes confused as a result of commands being transmitted between items of equipment which neighbor each other. It is also possible that an infinite loop may be formed depending on the settings of items of equipment in the connection line. It is also necessary to know the structure of the items of equipment which it is intended to control with the command master and the structure of the connections between the equipment in the overall system, so the plug numbers can be designated directly.

Also, in connection control method 2, no matter how simply a connection is made between a plug for an item of equipment and the preceding item of equipment to which the plug is connected, this cannot be achieved without a request being made to the AV center. Further, designation can be made using the sub-device category at the time of a connection request, but plug set-up can only be achieved for an item of equipment's own plugs, for which the structure is known.

It is therefore apparent that connection control of a variety of AV signals by holding connection information for input/output plugs on the outside of items of equipment and present within interfaces is not appropriate. It is therefore the object of the present invention to provide a communications system capable of resolving these kinds of problems.

SUMMARY OF THE INVENTION

In order to resolve the aforementioned problems, in the present invention, a communications system has a number of items of equipment having input/output plugs and containing functional units connected via a bus capable of transferring packets containing combinations of control signals and information signals. The input/output plugs for the items of equipment within the system are then given attributes and handled in the same way as the functional units within the items of equipment.

Here, the input/output plugs may also be only for inputting and outputting information signals and may not be connected to the bus. Alternatively, the input/output plugs may be bus channels. Items of equipment within the system may be VTRs, TVs and MDPs etc. In this case, the information signals may be image signals and/or audio signals.

Also, in the present invention, a communications system has a number of items of equipment, connected via a bus, capable of transferring packets containing combinations of control signals and information signals, where virtual plugs for inputting and outputting information signals are set up at each item of equipment within the system and information signal connections between each of the items of equipment are made by controlling connections between the plugs. It is preferable to carry out the inputting of the information signals and the outputting of the information signals independently by setting up the virtual plugs separately for input and output.

Further, in this invention, connections made between the items of equipment using virtual plugs and connections made between functional units for inputting and outputting information signals within the items of equipment and virtual plugs for the items of equipment are carried out independently from each other.

Also, the virtual plug may consist of at least plug enable information and an information signal channel number written in a fixedly allotted manner to a region of a storage means such as, for example, a register etc. and inputting and outputting of information signals using written-in channels can be carried out by controlling the plug enable information. In the case of an output plug, the information signal transfer speed and bandwidth are written in and the outputting of the information signal is carried out for the written in channel at the written in transfer speed and bandwidth. Also, an item for preventing the written-in information from being overwritten is set up as it is preferable to provide protection for the connection conditions.

According to the present invention described in detail above, input and output plugs for communications equipment are assigned numbers and are handled and categorized in the same way as for sub-devices. In this way, input and output plugs can be designated in the same way as for sub-devices while connection control commands are being configured. As a result of this, it is not necessary for the command master to be aware of the connection structure of the opposing item of equipment or the connection configuration for the items of equipment in the overall system. Items of equipment can therefore be subjected to control simply by making a designation using a category. The connection control therefore becomes simple and clear, so that rapid connection control can be achieved while requiring only a small number of communications.

According to the present invention, a control system for making connections between digital plugs is set up. This system is set up independently from a system for making connections between sub-devices within the items of equipment and digital plugs. In this way, the difference between the channel which depends on the digital bus and the bandwidth is assimilated and an environment is provided which is the same as being physically connected via an analog signal line. It is therefore possible to interface via a digital plug without having to graft a the concept of a digital bus. characteristic to internal connection control systems for existing equipment. This means that exchangeability with existing command sets can be maintained. By then setting up the digital plugs within a digital I/F communications IC, digital I/F compatibility can be maintained even without a communications control microcomputer. It is therefore possible to make equipment at a low price.

Also, it is no longer necessary to make requests to the AV center which carries out centralized processing of connection information when transferring commands from one place to the next in the way that was necessary in the prior art.

BRIEF DESCRIPTION OF THE DRAWINGS

FIG. 5 is a view showing the sub-device categorization;

FIG. 6 is a view showing an example of a category which is actually compatible with a sub-device number;

FIG. 7 is a view showing sub-device categorization;

FIG. 8 is a view showing an example of a category/address which is actually compatible with a plug number;

FIG. 9 is a view showing an example of a category/address compatible with an actual plug number for which the name has been changed to that of the specific opposing item of equipment to which it is connected;

FIG. 10 is a view showing the connection control when the output from an MDP using a categorized plug is recorded on a VTR 2;

FIG. 17 is a view showing the structure of a communications system where AV equipment is connected by analog signal lines and digital control signal lines;

DETAILED DESCRIPTION OF THE PREFERRED EMBODIMENTS

Embodiment

The following is a detailed description with reference to the diagrams of
1. a communications system to which this invention is applicable;
2. a sub-device categorizer;
3. a plug categorizer;
4. a specific example of connection control using a categorized plug;
5. a virtual plug set up,
6. a specific example of connection control using a virtual plug; and
7. an example of equipment equipped with a virtual plug, with respect to the embodiments of this invention.

1. The communication system to which this invention is applicable.

Figure 1:
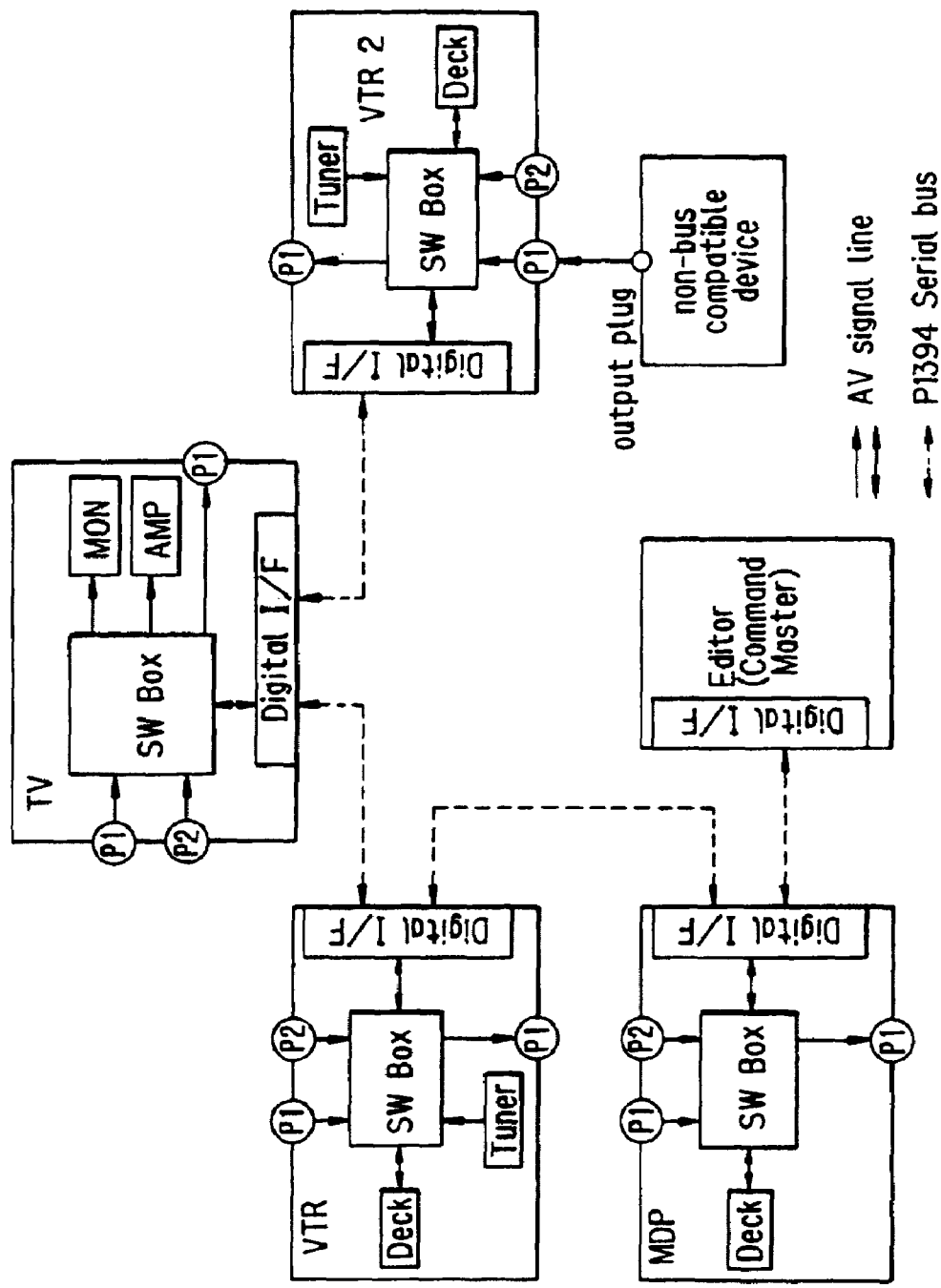
FIG. 1 is a view showing an example of a structure of a communications system to which this invention is applied.

FIG. 1 is a view of an example of a system structure of a communications system to which this invention is applicable. This communication system is equipped with an MDP, TV, VTR 1, VTR 2 and editor. Connections are made between MDP and VTR 1, VTR 1 and the TV, the TV and VTR 2 and the editor and the MDP using P1394 serial buses. An non-bus compatible device is also connected at the input plug P1 after the VTR 2.

The input plugs and the output plugs for each of the items of equipment are independently numbered, with a category being assigned internally for each item of equipment. Each plug is arranged so as to be an equal distance from the sub-device with respect to the center of the switchbox. It is usual for these input/output plugs to be connected to non-bus compatible devices. Intermittent attributes (analog line input, digital line input) for the plug categories are held as defaults and specific opposing connections are held as user entries (These will be described in detail later). There are also cases where AV signal lines for the audio signals and video signals within the equipment are independent of each other, but in order to keep the description simple, no discrimination will be made in this case. There is also an AVC sub-device present for controlling the operation of all the items of equipment, but this is not shown in the diagrams.

Each item of equipment (non-bus compatible items of equipment excluded) is equipped with a digital interface (hereinafter referred to as digital I/F) for the P1394 serial buses. This digital I/F is a dedicated communications IC for carrying out the transfer of control signal and information signal packets.

Figure 2:
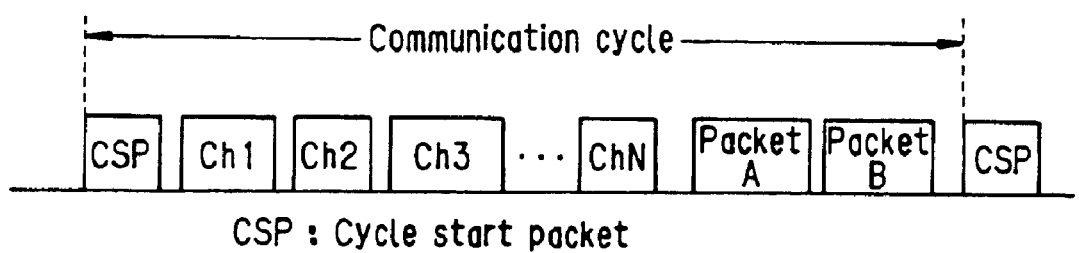
FIG. 2 is a view showing an example of the communications cycle occurring in the communications system in FIG. 1.

At the P1394 serial bus, communication is carried out in prescribed communication cycles (for example, 125 micro seconds), as shown in FIG. 2. The communication of information signals such as compressed digital video signals is carried out both synchronously, where communication is carried out serially at a fixed data rate, and asynchronously, where non-periodical transfers take place in response to the necessary control signals such as control commands etc.

There is a cycle start packet CSP at the start of the communication cycle, after which the period for transferring the packet is set up to ensure synchronous communication. It is possible to carry out a number of synchronous communications by assigning channel numbers 1, 2, 3, . . . N to the packets for carrying out synchronous communications.

After the transfer of the synchronous communication packets for all of the channels is completed, the period until the next cycle start packet CSP is used for non-synchronous communications. The non-synchronous communications packet (packets A and B in FIG. 2) has the physical addresses and logical addresses for the transmission equipment and receiving equipment. Each item of equipment then takes in the packet which has its own address attached.

The control signals and information signals can therefore be mixed together and transferred at the P1394 serial bus. As a result, it is no longer necessary to be aware of the connection structure while the digital I/F input/output plug for this bus is being handled.

Figure 3:
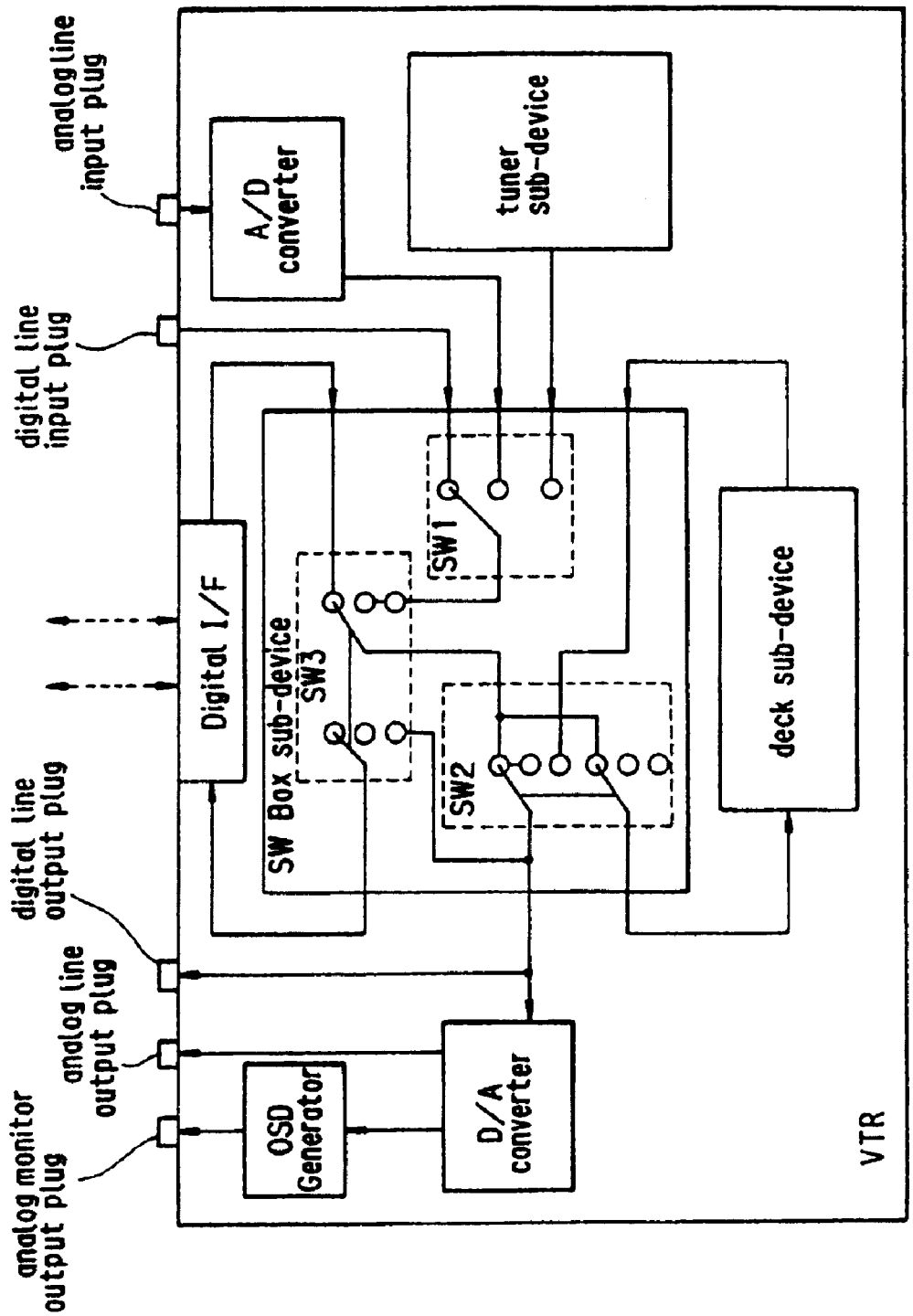
FIG. 3 is an example view showing the internal structure of the VTR in FIG. 1 in more detail.

FIG. 3 shows an example of the details of the internal structure of the VTR 1. The P1394 serial bus line (hereinafter referred to as the digital bus) in this diagram represents a bidirectional line consisting of two lines. This may also consist of one line going in just one direction or items consisting of three lines or more, depending on the item of equipment. Analog A/D converters and/or D/A converters are set up between the analog line input plugs and the analog line output plugs, and the switchboxes. An OSD generator (on screen display) is also connected to the monitor output plug.

Each sub-device and each plug is connected to either or both the AV signal input and output for the switchbox. Changeovers then can be made using each of the switches SW1 to SW3 within the switchbox. For example, SW1 changes over between the digital input plug, analog input plug. and tuner sub-device. The switch SW3 then changes over between these results and the input from the digital I/F. The switch SW2 is then changed over to output either these results, or the play-back input from the deck sub-device, from the switchbox. The switch SW2 also changes over whether to output to the deck sub-device at the time of picture recording. As this alternates with the input from the deck, this can be expressed virtually as two types of interlocking switches having three positions over all. It is also possible to change over whether or not to send output to the digital I/F at the switch SW3. As this is alternated with the input from the digital I/F, this can also be expressed by two kinds of inter locking switches having a total of three positions.

Figure 4:
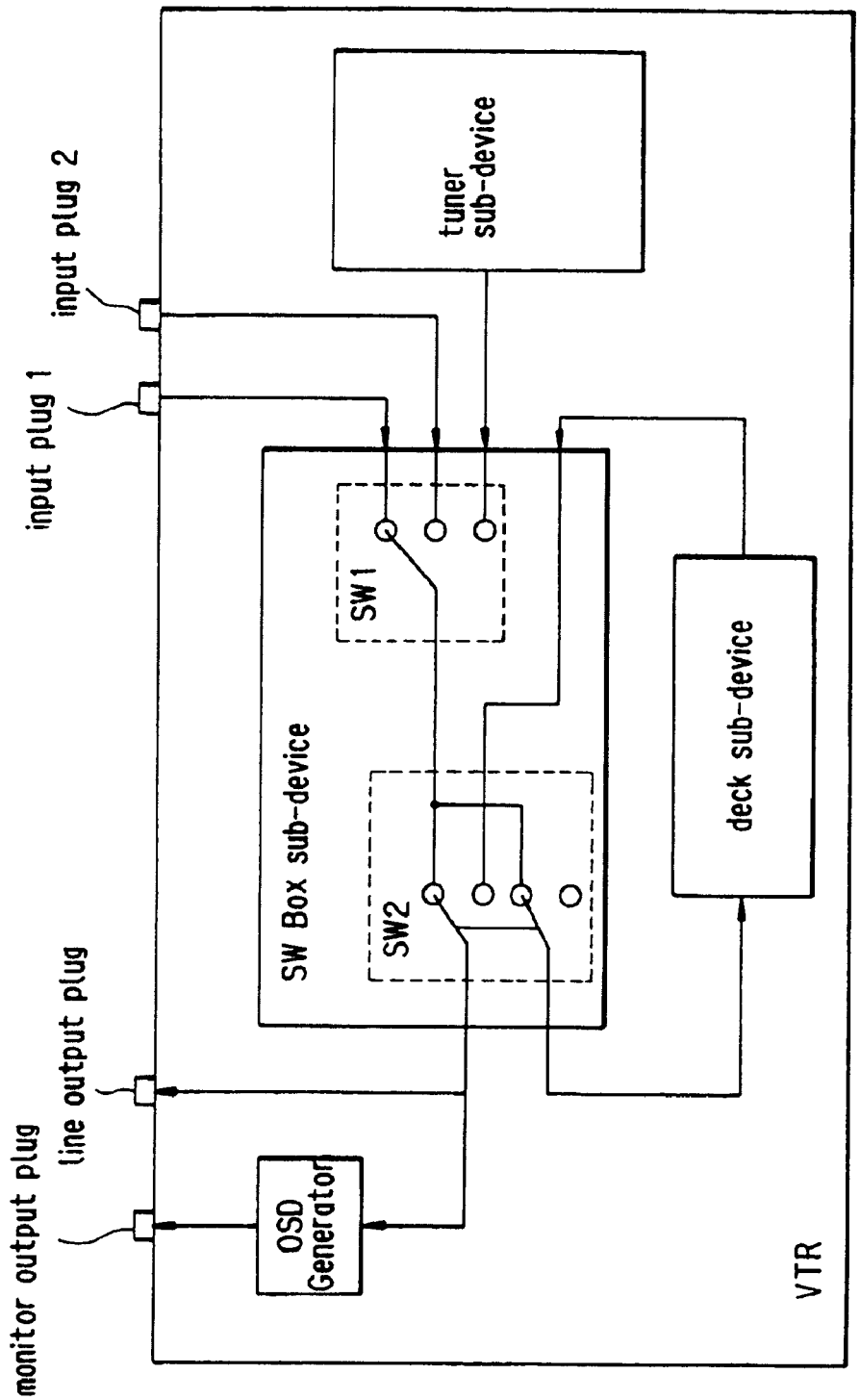
FIG. 4 is a view showing an example of the internal structure of the non-bus compatible device in FIG. 1.

In this way, in this invention, the plug and the functional unit may be considered equal while describing the internal structure of the items of equipment, so that inputs and outputs going to the switchbox may be distinctly divided. This method of expression may also be applied to non-bus compatible items of equipment of the kind shown in FIG. 4.

2. A sub-device categorizer.

FIG. 5 is a view of a sub-device categorizer. The sub-device number and category type are expressed respectively using ten bit data (B9 to B0). In this way, the decks sub-device number and category type for the VTR may be shown.

FIG. 6 shows an example of an actual sub-device number and corresponding category. This diagram shows a double-deck VTR consisting of a VHS/S-VHS VTR deck 1 and a 8 mm/High deck VTR deck 2.

3. A plug categorizer.

FIG. 7 is a view showing a plug categorizer. In this invention, the input/output plug and digital bus channel number for each item of equipment are handled together as a plug and then categorized. The plug number and the category type are expressed respectively as ten bit data (B9 to B0).

Numbers from 1 to 64 may be allotted as the plug numbers for input/output. Also, the input/output plug occurring at the digital bus, i.e. the channel, is selected as one of the channels 1–64 for input/output, while at the same time making a connection with only one route.

Figure 11A:
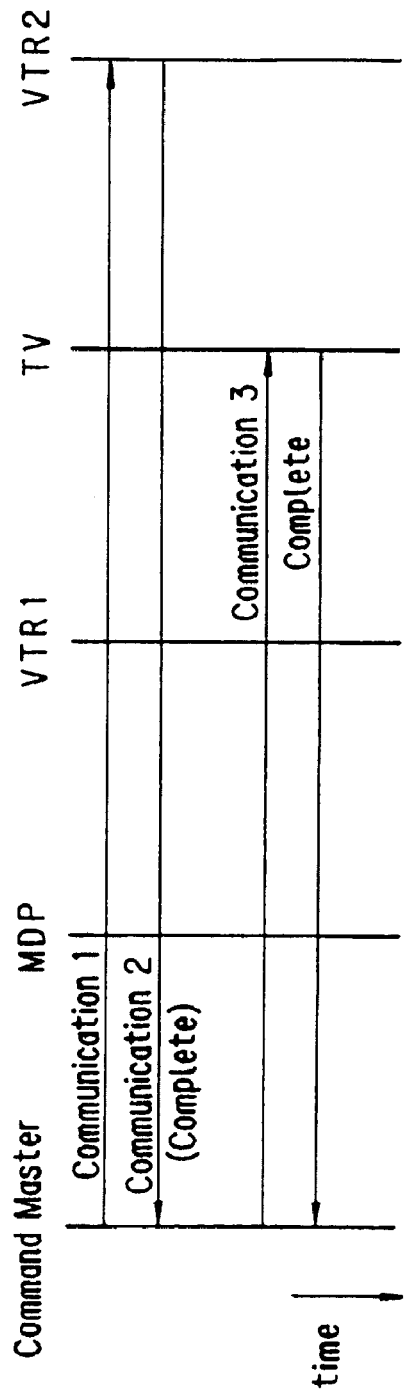
FIG. 11 is a view showing the connection control when the output from a camera present in a non-bus compatible device connected to the input plug P1 of the VTR 2 which uses a categorized plug is displayed on a TV.

The category type shows the category of the item of equipment connected to plug number 1 to 64. Connection control is then carried out using this category, rather than the plug number (refer to the example in FIG. 11). With regards to the digital channel, as a specific logical address for the opposing item is stored (TV, VTR etc.), this category type is not used. However, "Digital bus CH?" uses the category designation command, "output at arbitrary channel" (refer to the practical example in FIG. 10).

FIG. 8 is a view showing an example of an actual plug number and a corresponding category/address. This diagram shows an item of equipment where plug 1 uses an analog line input and a monitor output, plug 2 uses an analog line input and an analog line output, and plug 3 uses a digital line output.

As can be seen from FIG. 8, when the category is based on the default, this category is expressed by usual plug attributes such as analog input/output and digital line input. However, if the category is based on user settings etc., the categories can be replaced with those for other specific connected items of equipment.

This is shown by the example in FIG. 9. This diagram shows an item of equipment where plug 1 is used for a camera input and a monitor output, plug 2 is used for a CD input and a video printer output and plug 3 is used for an audio deck output. A digital bus may also be connected depending on the system specification, and depending on the plug, this can also be considered to be the same as being connected to the opposing item of equipment. In this case, the address of the opposing item of equipment on the digital bus is stored.

As described above, with regards to the digital bus, the logical address for a specific opposing item of equipment is stored. However, at the same time, as only one channel is used, even if there is data within the expression this will only occupy one place. When an item outputs from itself, a number of items of equipment which input to this channel exist. This means that a number of logical addresses can be stored at one place within the expression. In FIG. 9, an output for a digital bus channel 2 shows that the TV and the VTR 2 are being taken as input.

As the plug and the functional unit can be considered to be the same in this invention, the plug can be indirectly indicated using the cateo while connection control is being carried out by another item of equipment, and the item of equipment which receives the commands can make a specific determination with regards to the plug.

4. A specific example of connection control using a categorized plug.

1. The case where recording is carried out with the MDP output going to the VTR 2. The following is a description with reference to FIG. 10, of the connection control for the case where the MDP output is recorded at the VTR 2. Here, FIG. 10(*a*) shows the communication sequence and FIG. 10(*b*) shows the commands.

First, the MDP receives a command for outputting the deck output from the command master (editor) to the digital bus (communication 1). If the MDP can output the output from the deck to the digital bus, this channel number (here this is channel 1) is transferred to the command master as an "On command".

Next, the command master receives the channel number sent from the MDP, and sends an inputted command going from the channel 1 to the deck to the VTR 2 (communication 3). If input is carried out from the channel 1 to the deck, the VTR 2 transmits notification of completion to the command master.

In this embodiment, connection control can then be carried out rapidly by designating the plug using the category "Digital bus channel?".

2. When the output for a camera present in the non-bus compatible item of equipment connected to the input plug P1 at the VTR 2 is displayed on a TV.

Figure 11B:
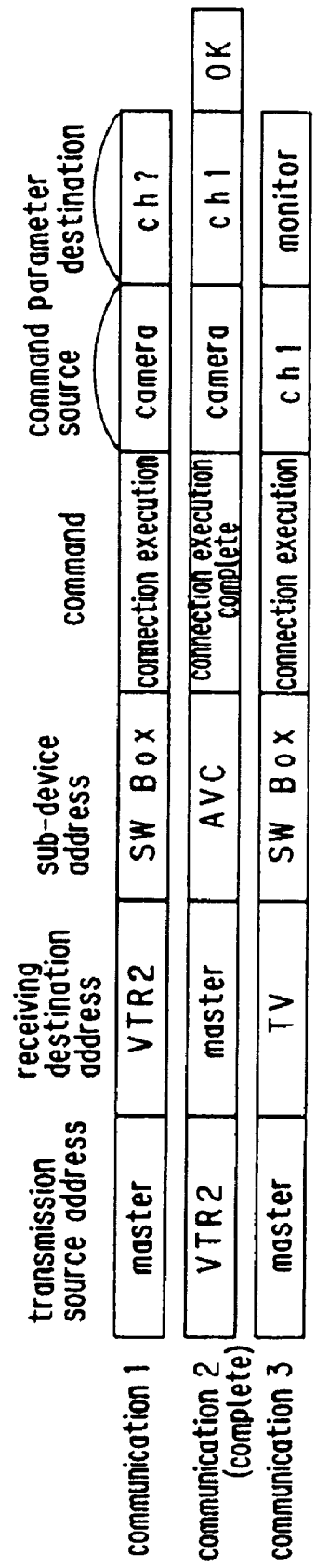

The following is a description of the connection control when the output for a camera present in the non-bus compatible item of equipment connected to the input plug P1 of the VTR 2 is displayed on a TV. Here, FIG. 11(*a*) shows the communication sequence and FIG. 11(B) shows the commands.

First, a command is received by the VTR 2 to the effect that camera output from the command master has been outputted to the digital bus (communication 1). It is then determined whether the input plug to which the camera is connected is P1. If it has been possible to output this to the digital bus, the outputted channel number is transferred to the command master (communication 2).

The command master receives the channel number (here this is channel 1) sent from the VTR 2 and sends a command for inputting from channel 1 to the monitor to the TV (communication 3). If the TV then inputs from the channel 1 to the monitor, notification of completion is sent to the master.

In this way, in the present invention, regarding the analog plug number which was directly designated in the conventional connection control method 1, this is designated as the indirect category known as, "camera". Also, in the conventional connection control method 2, a connection request could not be made if the leading plug number for the opposing item of equipment was not known. However, in this invention, the connection request can be made using the category designation in the way described above.

5. Virtual plug set up.

It is not necessary to divide the digital bus between physical plugs in the same way as for the analog signal line because in this case compressed digital data is periodically outputted at time divided channels. However, the effect of deciding a path from one item of equipment to a different item of equipment is the same as if the connection were carried out using an analog signal line. Also, when one item of equipment is handling a number of channels at the same time, it is necessary to be able to discriminate between these channels. Virtual plugs are therefore set up in this embodiment, so that channels can be discriminated between during inputting and outputting. Input and output is also set up separately for these virtual plugs in the same way as for analog plugs.

Figure 12:
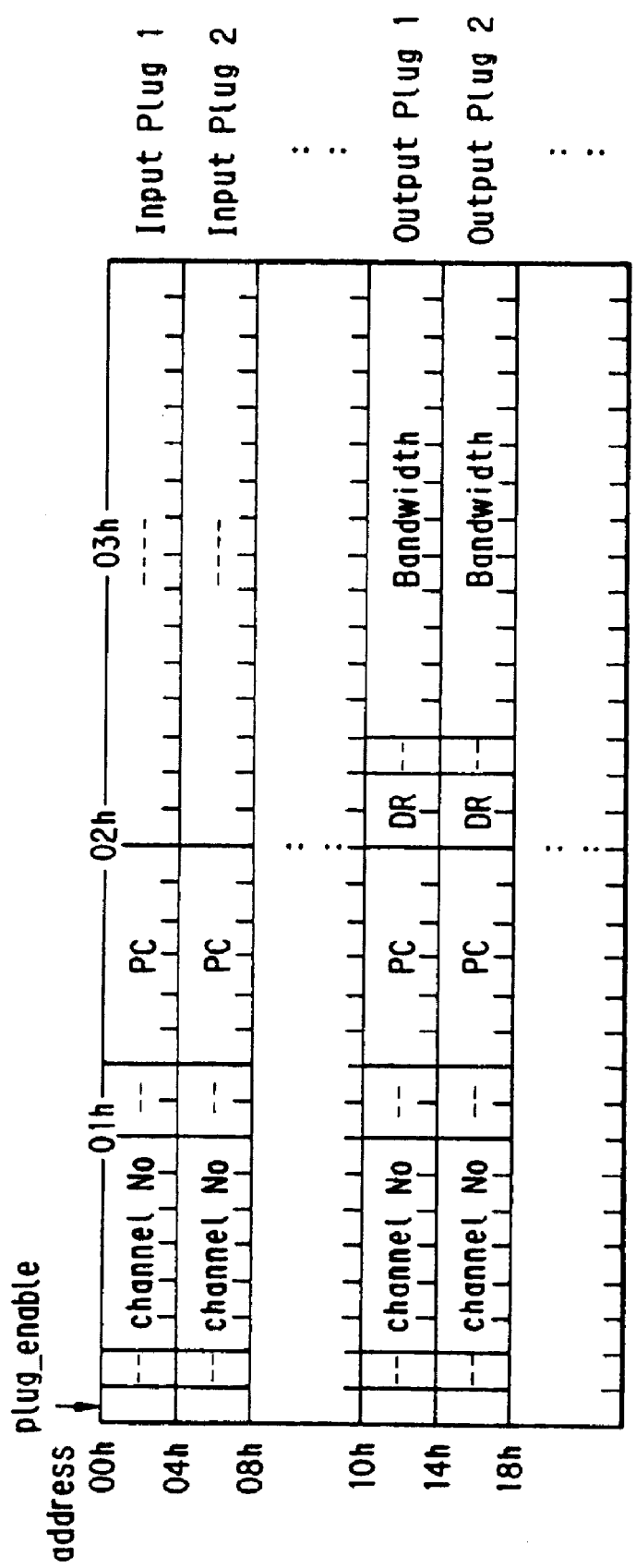
FIG. 12 is a view of an example of a digital plug.

FIG. 12 is a view of an example of a virtual plug occurring in the communications system for this invention. In the following description, the virtual plug will be referred to as the digital plug. Here, the digital plug is a register decided by the address, with 4 bytes expressing 1 plug. Input plug 1 is represented by the 4 bytes for addresses 00H to 03H, and input plugs 2, 3 and 4, are-represented by addresses 04H to 07H, 0AH to 0BH and 0CH to 0FH, giving a maximum of 4. Also, output plug 1 is represented by the 4 bytes from addresses 10H to 13H, output plugs 2, 3, and 4 are represented by addresses 14H to 17H, 18H to 1BH and 1CH to 1FH, giving a maximum of 4. The input/output plugs should only be set at to the number of plugs which the equipment can use at any one time. For example, with equipment which can only handle 2 input/output systems at a time, the regions in the diagrams [ . . . ] become empty registers. As the addresses for the input/output plugs occurring at each item of equipment are then the same, each item of equipment is aware of the plug addresses for each of the other items of equipment. Each item of equipment can therefore read and write to its own plugs or to plugs for other items of equipment easily.

If the plug enable for the input plug is set to one, the digital I/F receives synchronous communications packets for information signals from the channel set by the channel number (However, just completing connections with the outside does not by itself change the conditions within equipment such as the condition of the input selector etc., so that inputting is not actually carried out simply as a result of the conditions within the equipment). Clearing the plug enable for the input plug to 0 will stop the digital I/F from receiving signals. Other fields for the plug are also cleared to 0 at this time. When the signal connector with the transmitting equipment is being protected, the LSB for the PC (Protect Counter) for the input plug is set to 1 and when there is no protection this is cleared to 0.

If the plug enable for the output plug is set to 1, the digital I/F transmits synchronous communication packets for the information signal to the channel set according to the channel number, at a transfer speed designated by the data rate (DR) while using the band expressed by Bandwidth (internal equipment conditions such as the playback output for the VTR etc. do not change simply as a result of the completion of an external connection. Actual outputting is therefore not carried out simply depending upon the conditions within the equipment). If the plug enable for the output plug is cleared to 0, the digital I/F stops transmitting signals. Other fields for the plug are also cleared to 0 at this time. The PC for the output plug is incremented by 1 when the signal connections with the receiving equipment are protected and is decremented by 1 where there is no protection. In this way, equipment making protection requests can be counted.

These plugs can therefore rewrite themselves or can be rewritten from other items of equipment. It is, however, necessary when the PC becomes "0" that rewriting should take place in order to ensure protection. The symbols [—] occurring at each plug are reserved bits.

An environment which is completely the same as that for the analog plugs can therefore be provided by keeping the digital plugs separate at input/output in this way. Also, connections between digital plugs and internal equipment connections are kept independent.

6. A specific example of connection control using a digital plug.

Figure 13:
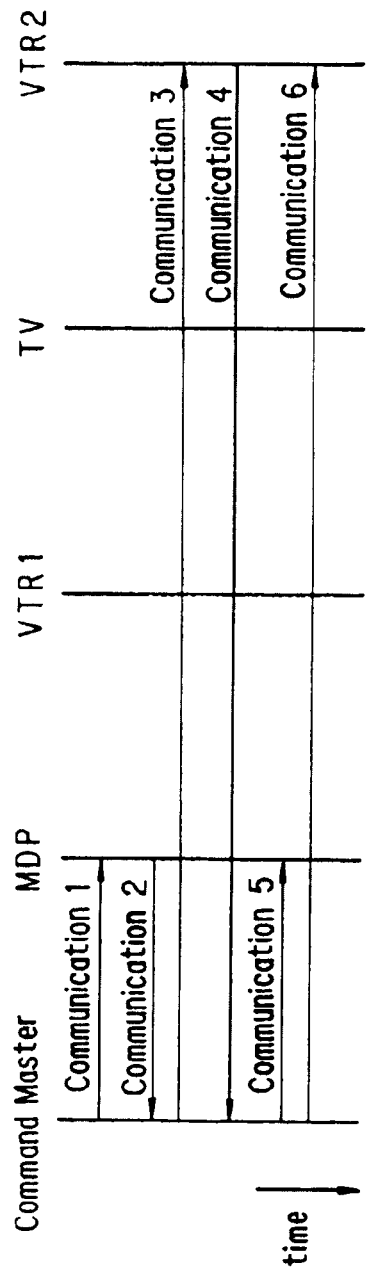
FIG. 13 is a view showing the connection control when the output from an MDP using a digital plug is recorded on the VTR 2.

The following is a description, with reference to FIG. 13, of connection control when the output for the MDP in FIG. 1 is recorded by the VTR 2. Here, FIG. 13(*a*) shows the communication sequence and FIG. 13(*b*) shows the commands.

First, the MDP receives a command so that the deck output from the command master (editor) is outputted to the digital plug (communication 1). If the MDP outputs the deck output to a digital plug, the resulting plug number (here this is plug 1) is transferred to the command master (communication 2).

The VTR 2 then receives a command so that a connection is made from the command master to the digital plug and on to the deck (communication 3). If the VTR 2 connects the digital plug to the deck, the resulting plug number (in this case this is digital plug 1) is transferred to the command master (communication 4).

The connection described above between the sub-device within the equipment and the digital plug uses the DDB command without modification. In this way, if the digital plug it is intended use is known, communications can be carried out so that the command master can actually be connected to its fellow digital plug. In order to set up the digital plugs for the source equipment and destination equipment, a transaction is to be transmitted (communication 5) so that a channel number, transmission speed and band width can be written at the digital output plug 1 for the MDP. A further transaction is then transmitted (communication 6), to prepare for the writing of the channel number at the digital input plug 1 for the following VTR 2.

Here, the communications 5 and 6 are not DDB commands. The transaction known as read-write-rock, for designating the opposing register address and writing the data is provided at P1394. With regards to DDB commands such as, "exchange command", data is written so as to be exchanged between command registers, which is achieved by then interpreting the data. With regards to this, communications 5 and 6 can utilize the transactions more directly. The instruction, "set up the opposing digital plug" can then be executed by designating the opposing address as well as the digital plug address and then writing in. Also, "find out the input/output conditions for the opposing digital plug" can be executed by designating the digital plug address and then carrying at the reading operation.

In this embodiment, connections between sub-devices within the equipment and the digital plugs (communications 1 to 4) use higher order commands present in the DDB commands, and plug connections between items of equipment (communications 5 and 6) use digital bus protocol. That is to say, the control system for making connections between digital plugs and the control system for making connections between sub-devices within the items of equipment and digital plugs are independent. It follows that matching can be achieved by digital plugs without having to insert a conception of the digital bus characteristics to a connection control system within existing equipment, so that interchangeability with existing command sets can be maintained.

7. An example of equipment equipped with digital plugs.

Figure 14:
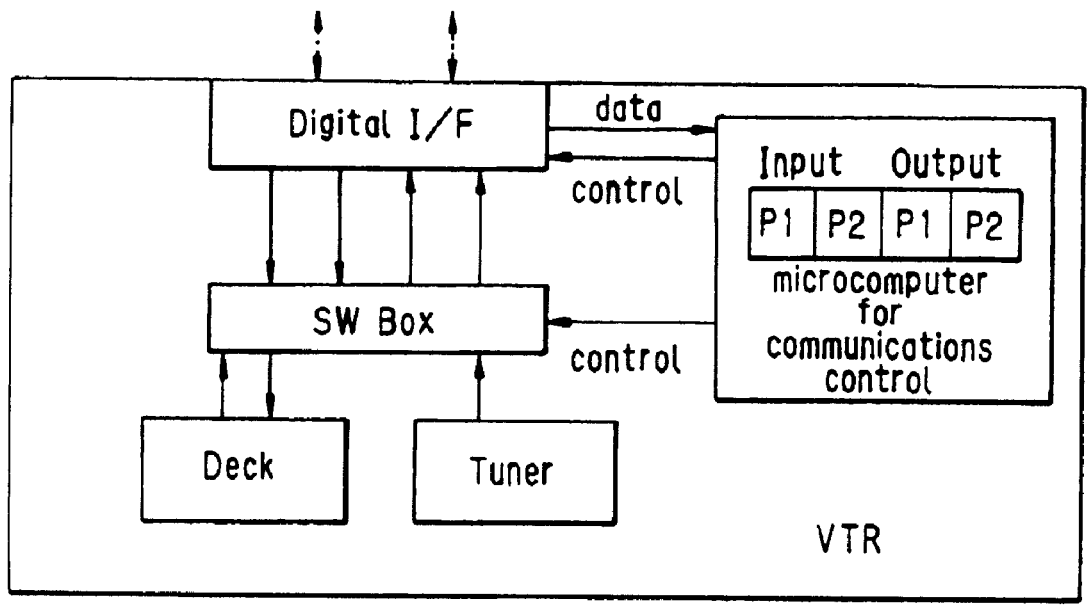
FIG. 14 is a view showing an example of a structure for a VTR equipped with digital plugs.

FIG. 14 is a view showing an example structure for a VTR equipped with digital plugs. Here, the digital plugs P1 and P2 for input and output are set up in the ram area within a communications controlling microcomputer. The communications controlling micro computer (which is equivalent to an AVC sub-device) takes data from the digital I/F and sends a control signal for controlling the digital I/F or the switch-box sub-device so as to activate the designated task. For example, when a transaction of the kind in communication 6 in FIG. 13 going to the digital plug P1 is received, a control signal is sent so as to control the digital I/F so that an information signal from the channel number that is written in is inputted. If the kind of command in communication 3 in FIG. 13 is received, a control signal is sent to control the switchbox sub-device so that the deck sub-device is connected at the digital plug P1.

Figure 15:
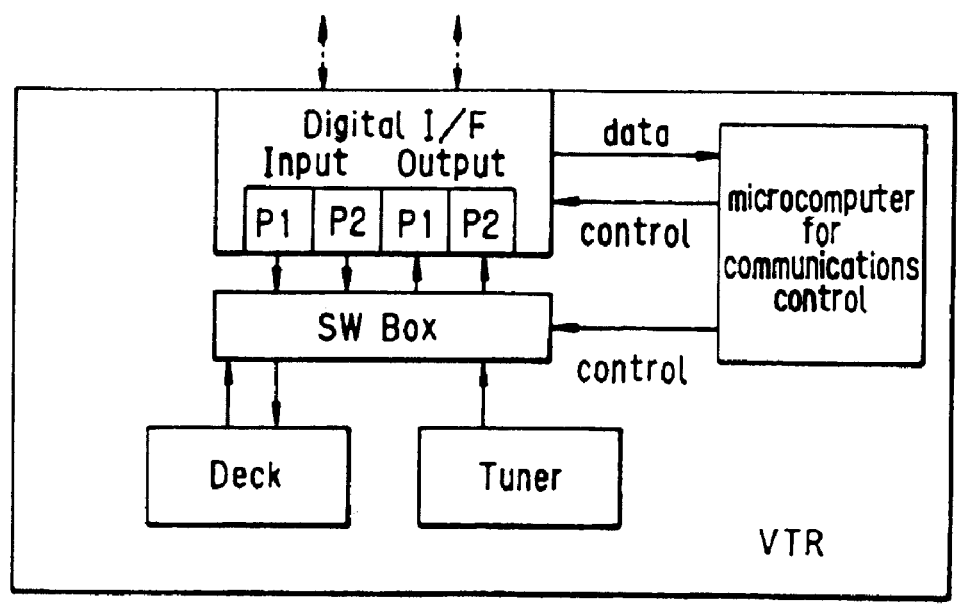
FIG. 15 is a view showing a further example structure of a VTR equipped with digital plugs.

FIG. 15 is a view showing a further example of a structure for a VTR equipped with digital plugs. Here, transactions going to the digital plugs access registers within the digital I/F directly so that the digital plugs P1 and P2 for input and output may actually exist in the register area within the digital I/F. The digital I/F then activates the designated path. The micro computer for communication control may then transmit the conditions at which the digital plugs are set up and actually operating as data, if necessary.

Figure 16:
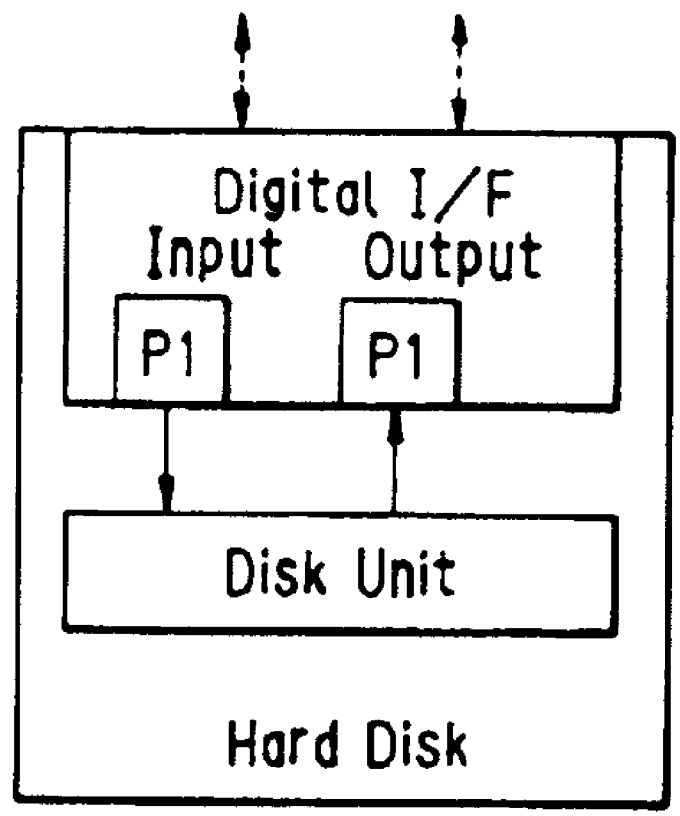
FIG. 16 is a view showing an example hard disc structure for a hard disc apparatus equipped with digital plugs.
Figure 18A:
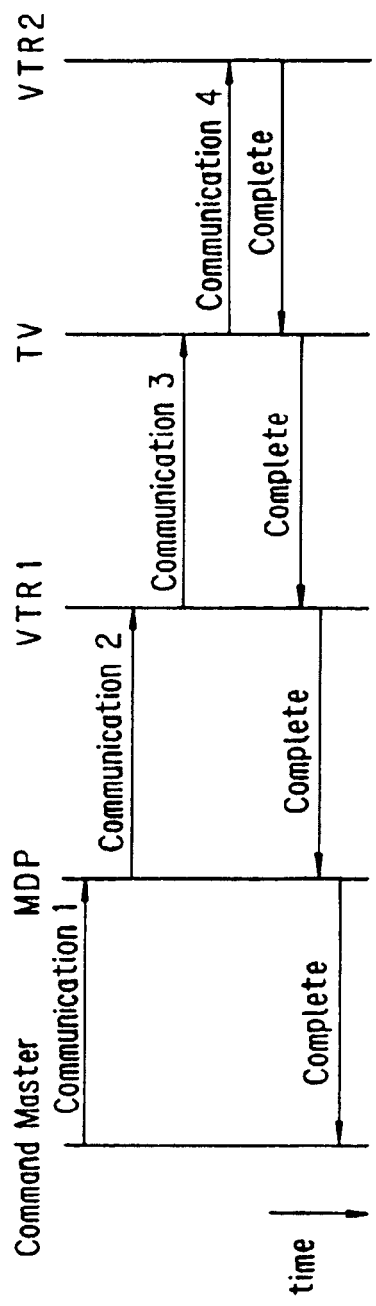
FIG. 18 is a view showing an example of the connection control method occurring in the communications system in FIG. 17.
Figure 18B:
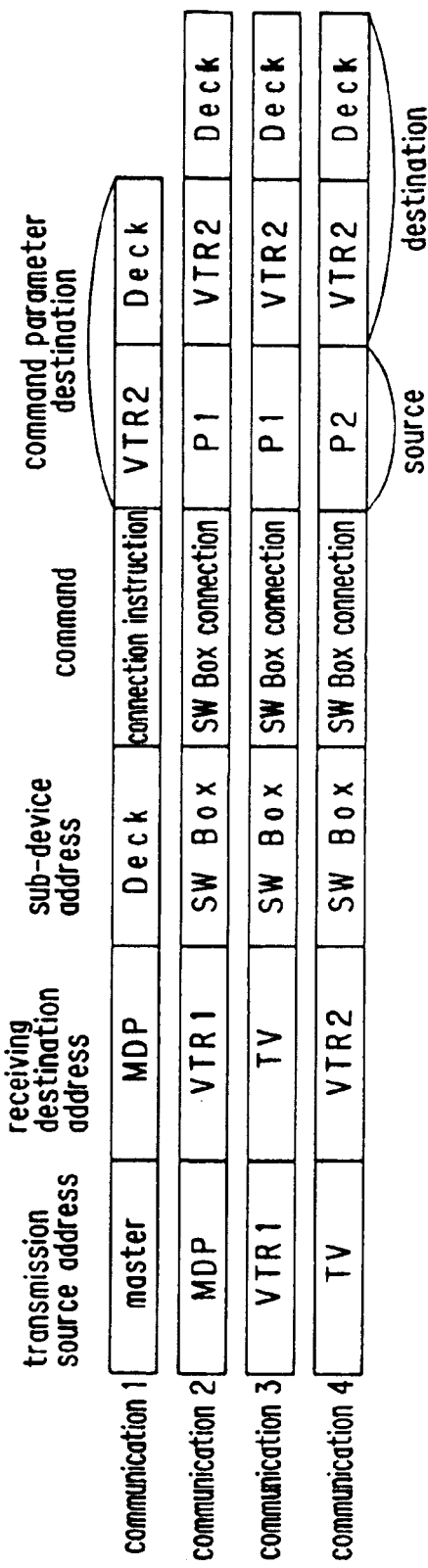
Figure 19A:
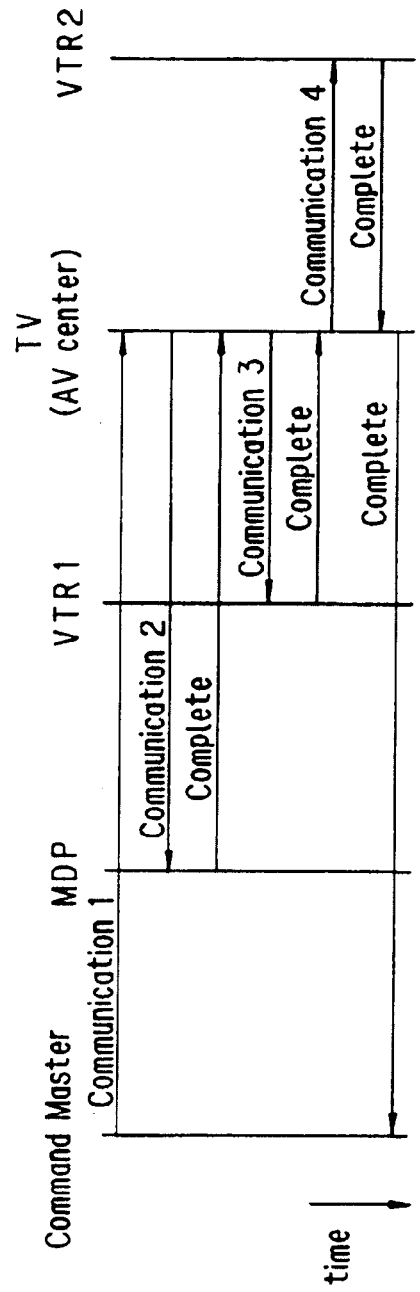
FIG. 19 is a view showing a further example of the connection control method occurring in the communications system in FIG. 17.
Figure 19B:
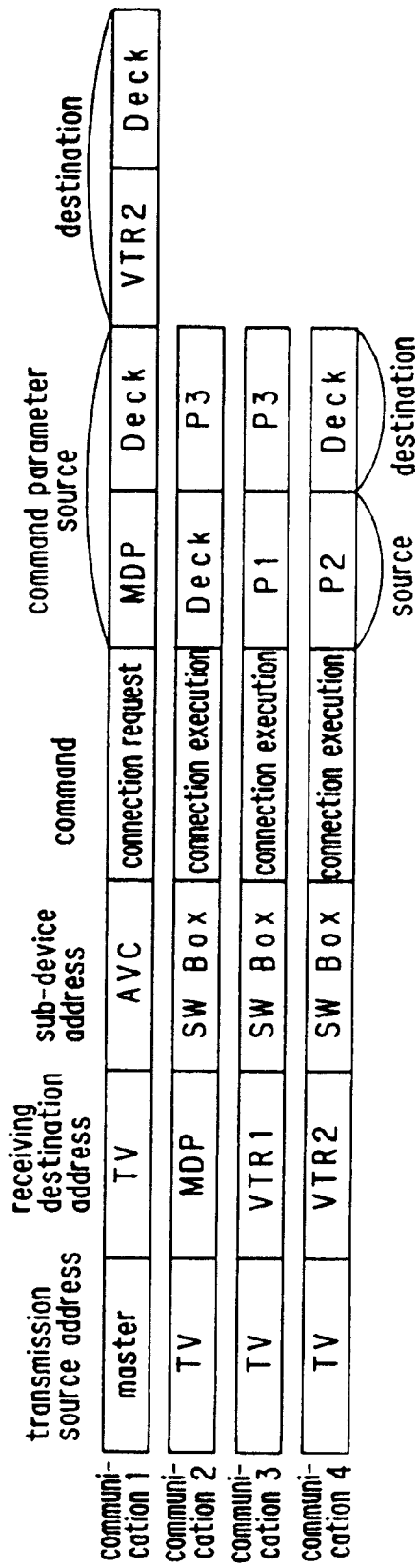

FIG. 16 is a view showing an example structure for a hard disc equipped with digital plugs. Here, the digital plug P1 for input and output is set up within the digital I/F. As the functional unit within the apparatus (sub-device) is a single disc unit, there is a single digital plug for input/output and a connection is always made with the sub-device. Connection control such as DDB etc. is therefore not necessary, and compatibility with a digital bus can be achieved even if there is no microcomputer for communications control. It is therefore possible to manufacture low cost equipment.

Also, one input/output plug may now be set up for one digital bus channel number. In this way, it is only necessary to set up digital plugs for the numbers of channels present in the system and it is no longer necessary to write the channel number at the digital plug.

What is claimed is:

1. A communication method for a communication system in which a plurality of electronic apparatuses are connected via a digital bus configured for transferring isochronous communication packets labeled with channel numbers and asynchronous communication packets in a certain communication cycle, wherein information signals are transmitted on said isochronous communication packets and control signals are transmitted on said asynchronous communication packets, and wherein each of said electronic apparatuses have digital output plugs which output said isochronous communication packets or digital input plugs which input said isochronous communications packets, said method comprising the steps of:

controlling said digital output plugs implemented as registers to which respective addresses are allocated at a transmitting apparatus, wherein the register for said digital output plug includes a channel number field indicating a channel number;

controlling said digital input plugs implemented as registers to which respective addresses are allocated at a receiving apparatus, wherein the register for said digital input plug includes a channel number field indicating a channel number;

using a first counter included in the digital output plug control register at a transmitting apparatus to protect connections with receiving apparatuses;

using a second counter included in the digital input plug control register at a receiving apparatus to protect connections with transmitting apparatuses;

transmitting said information signals from one digital output plug at the transmitting apparatus onto one channel; and receiving said information signals on said one channel at each of digital input plugs in a plurality of receiving apparatuses.

2. The communication method according to claim 1, wherein said registers include information indicating whether or not said information signals can be transmitted or received.

3. The communication method according to claim 1, wherein said registers include information relating to a data rate.

4. The communication method according to claim 1, wherein said registers include information relating to a band.

5. The communication method according to claim 1, wherein said digital bus is an IEEE 1394 bus.

* * * * *